United States Patent [19]
Roberson

[11] Patent Number: 5,129,141
[45] Date of Patent: Jul. 14, 1992

[54] APPARATUS FOR INSERTING COLLAR NAILS

[75] Inventor: Luther G. Roberson, Athens, Tenn.

[73] Assignee: Plastic Industries, Inc., Athens, Tenn.

[21] Appl. No.: 671,466

[22] Filed: Mar. 19, 1991

[51] Int. Cl.⁵ .................... B21J 15/28; B25C 7/00
[52] U.S. Cl. .................... 29/716; 29/798; 29/252; 227/149
[58] Field of Search ........ 29/432, 525, 525.1, 29/809, 268, 252, 716, 798; 227/149

[56] References Cited

U.S. PATENT DOCUMENTS

| 3,685,716 | 8/1972 | Frankie et al. | 227/149 X |
| 4,195,762 | 4/1980 | Burton | 227/149 X |
| 4,736,880 | 4/1988 | Sodeno | 227/149 |
| 4,848,638 | 7/1989 | Suzuki | 227/149 |
| 4,995,543 | 2/1991 | Earl | 227/149 X |

FOREIGN PATENT DOCUMENTS 2821712 11/1978 Fed. Rep. of Germany ...... 227/149

Primary Examiner—Timothy V. Eley
Attorney, Agent, or Firm—Kerkam, Stowell, Kondracki & Clarke

[57] ABSTRACT

Molded plastic overlays or trim members for upholstered furniture are provided with at least two special collar-type nails having two pointed ends with a collar therebetween. One of the pointed ends of the collar nails is assembled in apparatus disclosed in the application, while the other pointed end of each pair of collar nails is hammered into the frame of furniture by the manufacturer or upholsterer as part of the final assembly of chairs, sofas, and the like.

4 Claims, 7 Drawing Sheets

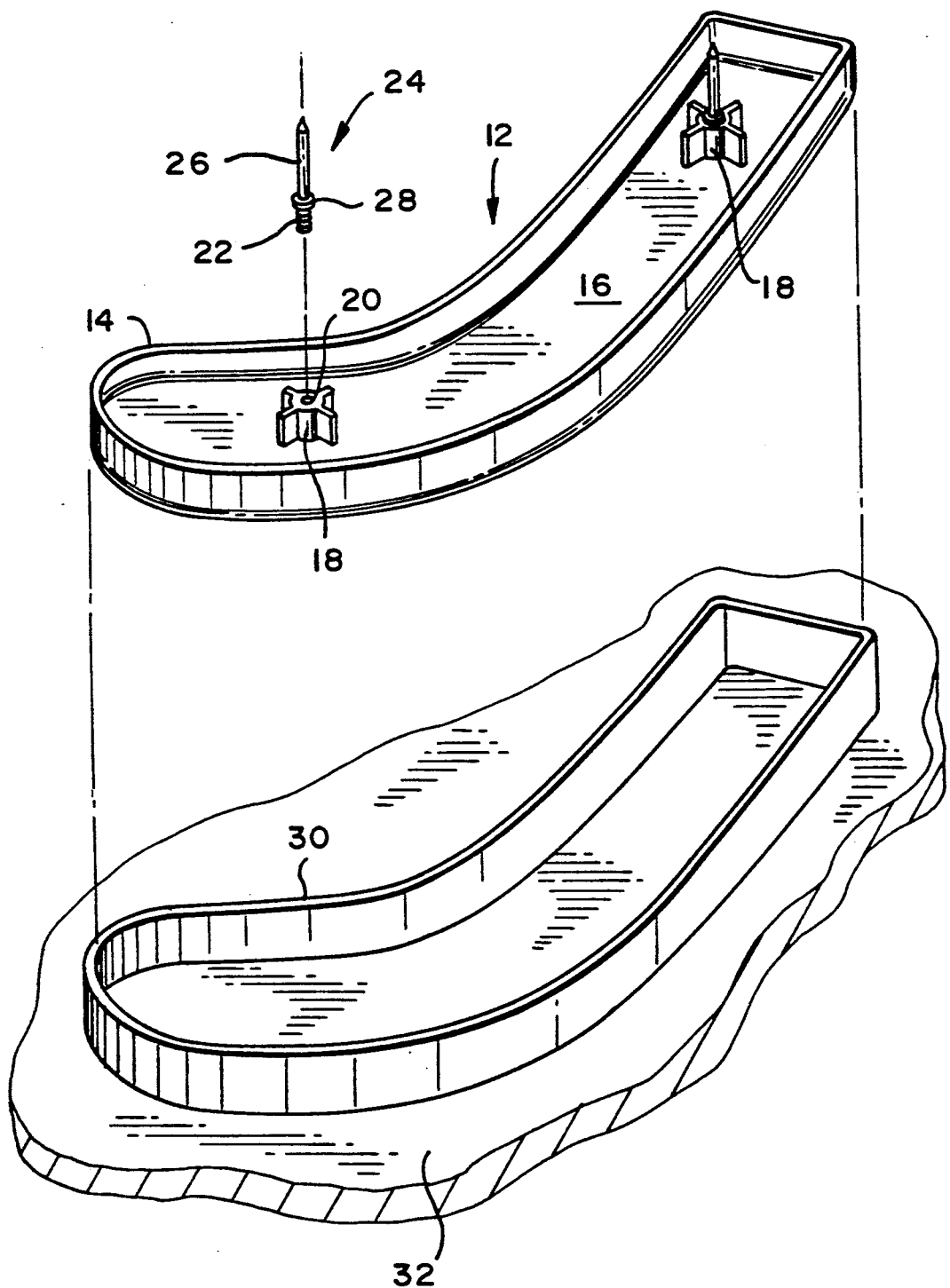

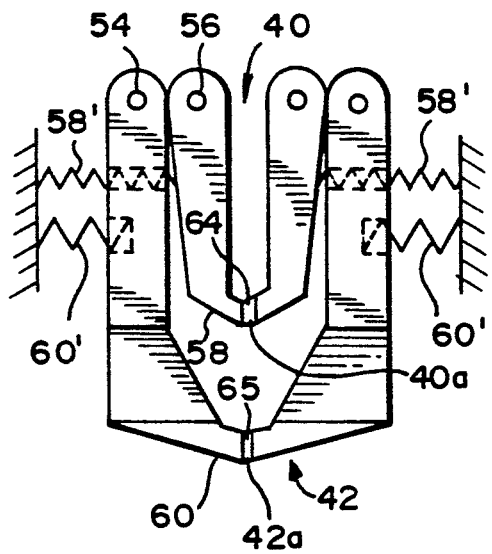
FIG_5
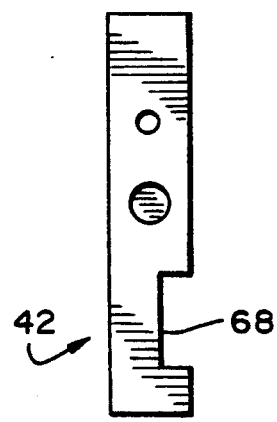
FIG_6
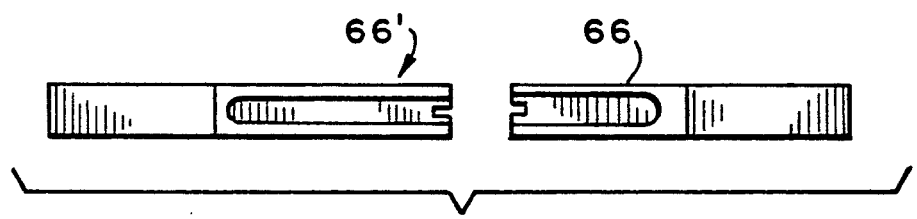
FIG_7
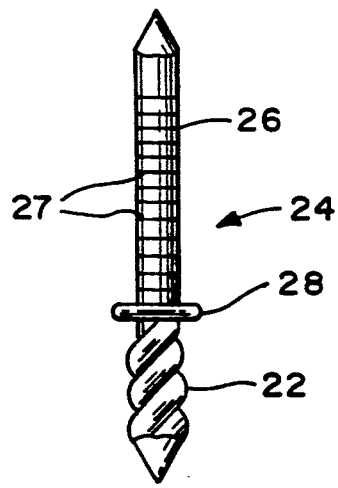
FIG_3
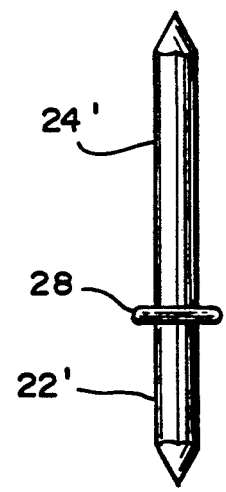
FIG_4a

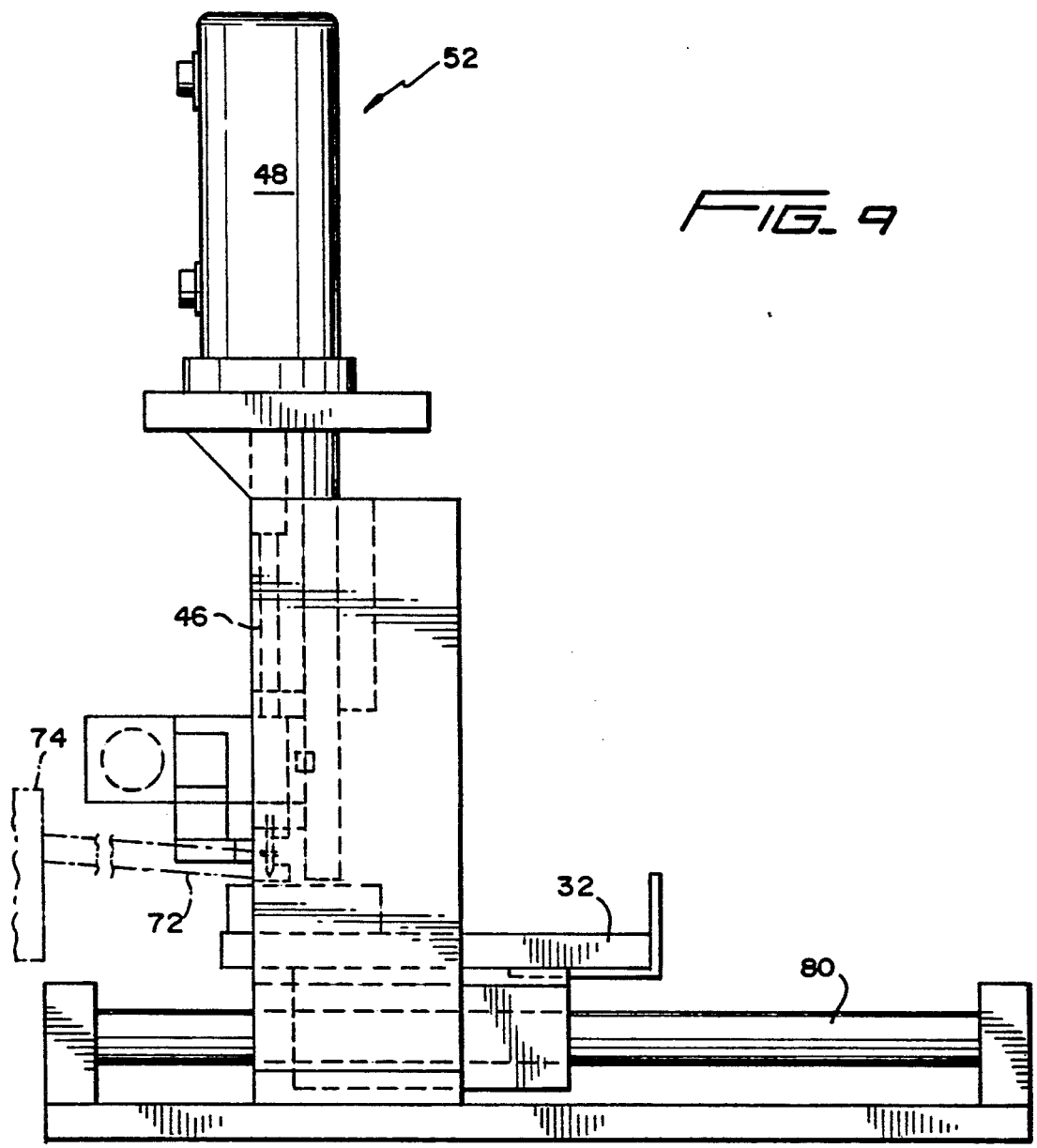

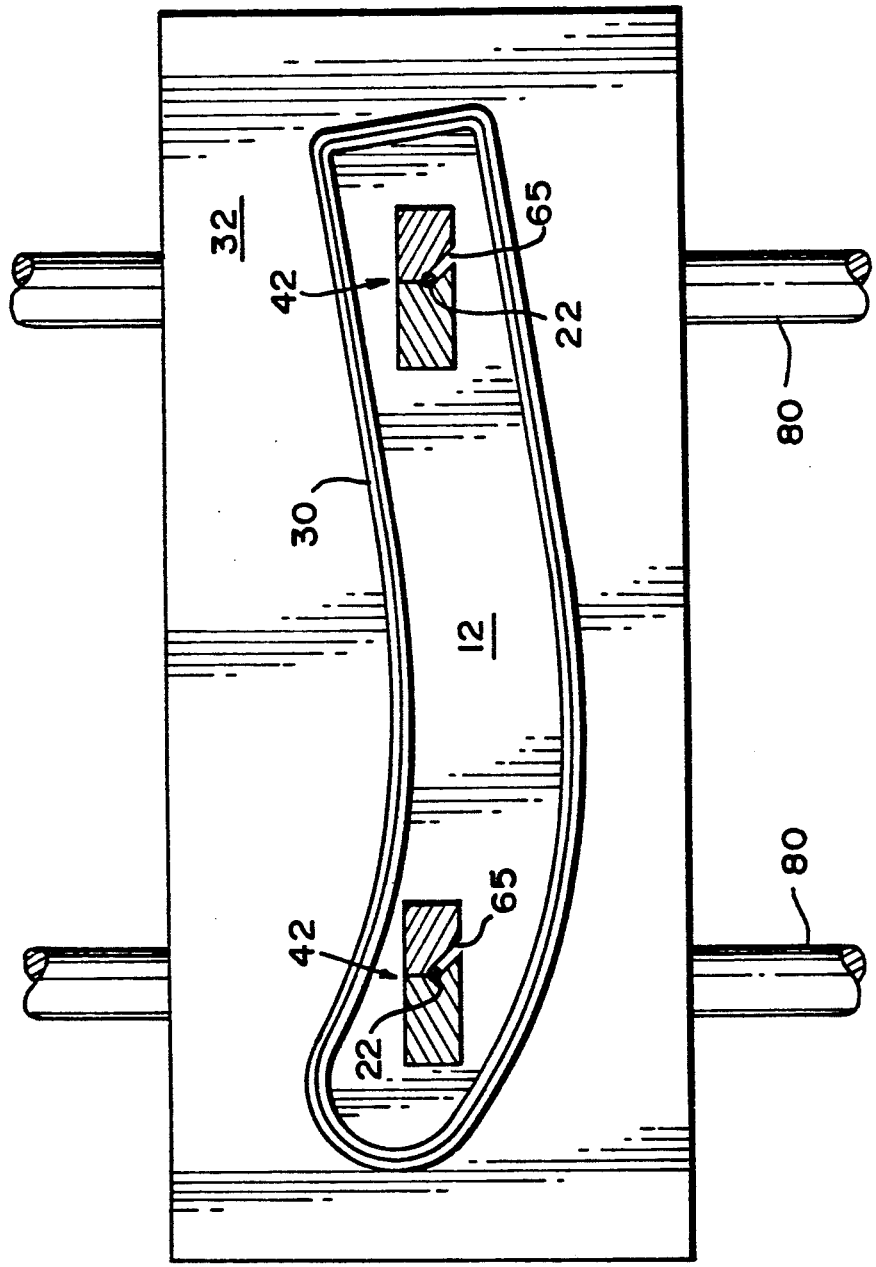

APPARATUS FOR INSERTING COLLAR NAILS

BACKGROUND OF THE INVENTION

Overlays or trim members are frequently employed by manufacturers of fabric-covered or upholstered chairs, love-seats, sofas, sofa beds and the like. The overlays improve the aesthetic appearance of furniture and, in addition, the overlays can cover fabric seams and protect the fabric in high-wear zones.

BRIEF SUMMARY OF THE INVENTION

The present invention provides molded plastic overlays or trim members for furniture wherein each overlay is provided with at least two special "collar" nails, which have pointed ends and a collar therebetween. One of the pointed ends of the collar nails is installed by automatic assemblers forming part of the present invention, while the other pointed end of the pair of collar nails is hammered into the frame of the furniture by the manufacturer or upholsterer as a part of the final assembly of the chair, sofa and the like.

Where a pair of collar nails is provided for each overlay, the collar nails are automatically driven in bosses (having collar nail receiving openings) molded interiorly of each trim member.

The mechanical placement and driving of the collar nails speed production and ensure that the other pointed end of each collar nail remains pointed and parallel with its counterpart collar nail.

BRIEF DESCRIPTION OF THE SEVERAL VIEWS OF THE DRAWING

FIG. 2 is an exploded view of a typical molded plastic overlay and supporting crib illustrating the placement of the collar nails in bosses molded with the unit;

FIGS. 3, 4a, and 4b illustrate special collar nails useful in the present invention;

FIG. 5 illustrates a part of the nail-inserting mechanism and a pair of nail-holding jaws;

FIG. 6 is an end view of the lower nail-holding fingers;

FIG. 7 illustrates a slide bar which receives and holds the collar of a special collar nail in accordance with the present invention;

FIG. 9 is a side elevational view of the structure shown in FIG. 8; and

FIG. 10 is a section on line 10—10 of FIG. 9.

DETAILED DESCRIPTION OF THE INVENTION

Figure 1:
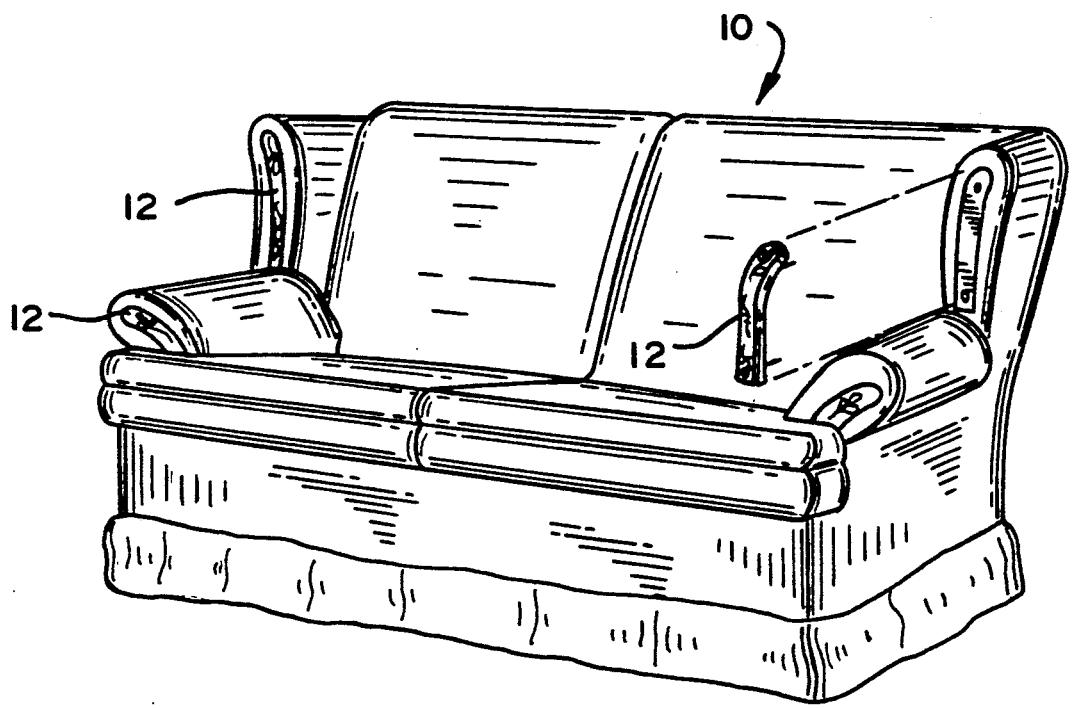
FIG. 1 illustrates a typical upholstered loveseat having overlays according to the present invention assembled thereon.

Referring to FIG. 1, illustrating a typical upholstered loveseat, generally designated 10, the upholstered seat has attached thereto nail-on overlays 12, constructed in accordance with the teachings of the present invention. Details of the nail-on overlay 12 are more clearly shown in FIG. 2. The overlay 12 is, in a preferred form of the invention, injection molded of plastic material such as polystyrene and includes side wall 14 and interior depressed inner surface 16. The external surface may be molded with decorative designs and made to resemble wood (not shown). Integrally molded with the overlay is a pair of bosses 18 having molded therein cylindrical openings 20 which receive a base portion 22 of a collar nail 24 having an upstanding wood nail portion 26 and a collar 28. The portion 26 may be provided with serrations 27 (See FIG. 3).

Figure 4B:
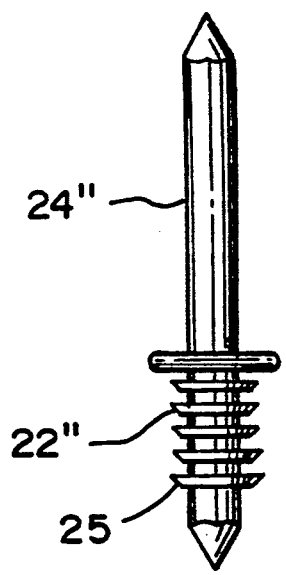

The collar has a typical diameter of about 3/16 inch, and the overall length of each of the collar nails is typically about 1 to 1¼ inch. Three forms of collar nails are illustrated in FIGS. 3, 4a and 4b. The collar nail 24 in FIG. 3 has a 45-degree spiral shank 22, whereas the steel collar nail 24' has a straight shank 22'. The collar nail illustrated in FIG. 4b has a plain wood-insertion portion 24" and a shank portion 22" provided with ridges 25 to improve the gripping ability of the shank in the molded plastic overlay. In each case, a collar 28 is provided on each nail. The collar abuts the upper surface of each of the bosses 18 when the collar nail is driven into the bores 20 formed in the bosses.

Figure 8:
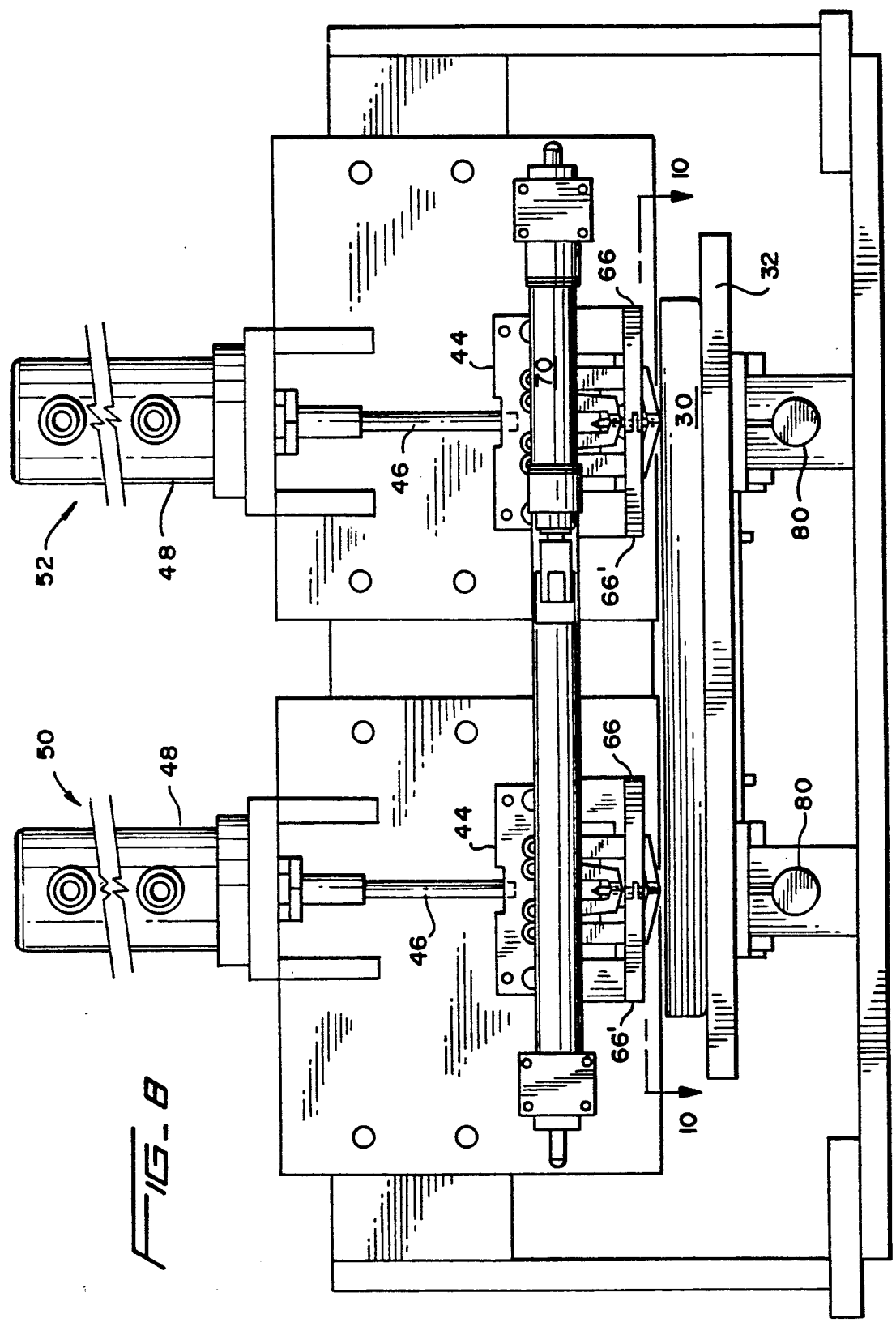
FIG. 8 is a front elevational view of a pair of nail-holding and inserting mechanisms constructed in accordance with the present invention.

Also illustrated in FIG. 2 is a metal cradle or nest, generally designated 30, which is received on a movable bed 32, FIGS. 8 and 9 of the drawing. The nest or cradle 30 is sized to snugly receive the overlays with the bosses 18 directed upwardly. The cradle prevents movement of the overlays during insertion of the collar nails in the bosses and aligns the bosses with the collar nail-holding fingers, as to be discussed hereinafter.

The collar nail-holding fingers are illustrated in FIGS. 5 and 6 and comprise an upper pair 40 and a lower pair 42. Each pair is pivotly mounted to a metal frame 44, FIG. 8, connected to a piston rod 46 of a pressure-fluid cylinder 48, preferably operating on compressed air. In the illustrated form of the collar nail insertion apparatus, there are two stations 50 and 52, each having its own air-pressure actuated cylinder 48, piston rod 46, and slide plate 44. As hereinbefore indicated, the two pairs of nail-holding fingers 40 and 42 are pivoted to the movable nailing frame 44 via pins adapted to be received in bores 54 and 56 at the upper end of each of the fingers. Normally, the fingers are in engagement at their nail-holding tips 58 for fingers 40 and 60 for fingers 42. The fingers 40 and 42 are urged into engagement by springs 58' and 60'.

It will be noted from FIGS. 5 and 10 that one finger 40a of pair 40 and 42a of finger pair 42 is beveled as at 64 and 65 so that the slide bars 66 and 66' can cam a collar nail between the ends 58 and 60 of each pair of fingers to hold the collar nails as illustrated in FIG. 8. The pair of fingers 42 has an opening 68 therethrough to permit the slide bars 66 and 66' to reciprocate therein. The slide bars 66 of each station 50-52 are movable by, for example, air-pressure cylinder 70, FIG. 8, to reciprocate from the outlet of a slide 72 projecting from a feeder bowl 74 of a conventional vibratory feeder and orienter shown in phantom lines. A useful form of feeder is manufactured by Midwest Feeder and is designated with the manufacturer's designation 6/008.

The slide bars 66 engage a collar nail at the end of the discharge chute 72 and insert each collar nail in the upper and lower fingers 40 and 42 and then move to permit the nailer to move downwardly upon actuation of the cylinders 50 and 52, forcing the ends 22 or 22' into the openings in the bosses molded in the overlay.

The following is a typical sequence of operation of the nail insertion apparatus following nail orientation by the vibratory feeder bowl 74, which feeds the nails in sequence into the metal tracks of the outlet chutes 72. Vibratory movement of the feeder bowl 74 causes the nails to move in the tracks onto the slide bars 66 and 66'. The slide bars feed the nails into the nail holding fingers 40 and 42 upon actuation of the pressure-fluid cylinder 70. It will also be noted that the base plate 32 of the machine reciprocates on a pair of cylindrical ways or bars 80, FIGS. 8 and 10, so that the operator can place in each nest or cradle 30 an overlay 14.

When the operator pushes the cradle-supporting plate 32 inwardly into position under the collar nails 24 or 24', this actuates a switch (not shown) that operates valves (not shown) to cause the cylinders 48 to urge the nailer plates 44 downwardly, inserting the nails in the openings in the bosses 18, FIG. 2 of the drawings. As the frame 44 moves downwardly, the pairs of fingers 42 are cammed outwardly by their angled bottom edges to permit the collar nails to be inserted into the bosses 18. When the nailer fitment 44 is moved upwardly, the operator pulls the carriage 32 from under the nailer, and a new overlay is placed in the crib or nest. Thus, both collar nails are simultaneously inserted in each overlay. The furniture manufacturer or upholsterer, as the case may be, drives the exposed shanks of the collar nails into the wood frames of the loveseat, or the like, in the desired position.

I claim:

1. Apparatus for inserting collar nails in molded plastic overlays for upholstered furniture comprising a table mounting at least one nest adapted to receive a molded plastic overlay, said overlay having at least one boss adapted to receive one end of a collar nail, upper and lower pairs of fingers for holding upper and lower ends of a collar nail with the collar of the nail between the upper and lower fingers, and a pressure-fluid ram for urging the upper and lower fingers into a collar nail inserting motion.

2. The apparatus as defined in claim 1 wherein the table mounts a pair of nests, each adapted to receive a molded plastic overlay, each of the overlays having the at least one boss, two spaced pairs of fingers for holding the upper and lower ends of a pair of collar nails with the collars of each of the nails positioned between the upper and lower fingers, and a pair of pressure-fluid rams, one for each of the spaced pairs of fingers, for moving the upper and lower fingers of each pair to insert collar nails held between the upper and lower fingers of each said pair of fingers.

3. Apparatus for inserting collar nails in molded plastic overlays as defined in claim 2, further including a pair of slide bars, means for engaging the collar of a collar nail in each of said slide bars, and pressure-fluid ram means for reciprocating each of the slide bars from a collar pin receiving zone to a zone where the collar pins are inserted between each of the pairs of fingers for holding the upper and lower ends of the collar nail.

4. The apparatus as defined in claim 3 wherein the table mounting a pair of nests is reciprocal from a position wherein molded plastic overlays are inserted in the pair of nests to a zone wherein the collar nails are urged into collar nail inserting position.

* * * * *